(12) United States Patent
Keller et al.

(10) Patent No.: US 10,345,814 B2
(45) Date of Patent: Jul. 9, 2019

(54) CONTROL SYSTEM AND CONTROL METHOD FOR GUIDING A MOTOR VEHICLE ALONG A PATH

(71) Applicant: TRW Automotive GmbH, Alfdorf (DE)

(72) Inventors: Martin Keller, Dortmund (DE);
Christian Goette, Dortmund (DE);
Torsten Bertram, Duesseldorf (DE);
Andreas Homann, Dortmund (DE);
Christian Wissing, Dortmund (DE);
Karl-Heinz Glander, Monheim (DE);
Carsten Hass, Duesseldorf (DE); Till Nattermann, Duesseldorf (DE);
Markus Buss, Duesseldorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 15/666,879

(22) Filed: Aug. 2, 2017

(65) Prior Publication Data

US 2018/0046192 A1 Feb. 15, 2018

(30) Foreign Application Priority Data

Aug. 11, 2016 (DE) .......................... 10 2016 009 760

(51) Int. Cl.
*G05D 1/02* (2006.01)
*B60W 30/095* (2012.01)
(Continued)

(52) U.S. Cl.
CPC .............. *G05D 1/0212* (2013.01); *B60T 7/22* (2013.01); *B60W 30/09* (2013.01);
(Continued)

(58) Field of Classification Search
CPC .......... G05D 1/0212; G05D 2201/0213; B60T 7/22; B60T 2201/022; B60W 30/09;
(Continued)

(56) References Cited

U.S. PATENT DOCUMENTS

| 5,870,303 A | * | 2/1999 | Trovato | ............. B62D 15/0285 |
| | | | | 700/255 |
| 2004/0090117 A1 | * | 5/2004 | Dudeck | ..................... B60T 7/22 |
| | | | | 303/191 |

(Continued)

FOREIGN PATENT DOCUMENTS

| DE | 102013016434 | 4/2015 |
| DE | 102013223377 | 6/2015 |

OTHER PUBLICATIONS

William Strunk Jr. and E.B. White, The Elements of Style, 3rd Edition, all pages. (Year: 1979).*

(Continued)

*Primary Examiner* — Calvin Cheung
(74) *Attorney, Agent, or Firm* — Tarolli, Sundheim, Covell & Tummino LLP

(57) ABSTRACT

A control system which for use in a host motor vehicle is configured and intended for recognizing motor vehicles traveling ahead, to the side, and/or behind and preferably stationary objects situated ahead, based on surroundings data obtained from at least one surroundings sensor associated with the host motor vehicle. The at least one surroundings sensor is configured for providing an electronic controller of the control system with surroundings data that represent an area in front of the host motor vehicle. The control system is at least configured and intended for detecting another motor vehicle, using the road, in front of the host motor vehicle by means of the at least one surroundings sensor, and determining movements of the other motor vehicle relative to a lane in which the other motor vehicle or (Continued)

the host motor vehicle is present, or relative to the host motor vehicle, determining, starting from an instantaneous location, a set having a predefined number of trajectories, differing with regard to their length and/or their course, for possible paths of the host motor vehicle, wherein the course of neighboring trajectories differs by a predefined difference between possible different steering angles of the host motor vehicle, and varying the predefined number of trajectories, the length, and/or the course of the trajectories as a function of a driving situation of the host motor vehicle, and generating at least one signal that assists a driver of the host motor vehicle in controlling the host motor vehicle in order to guide the host motor vehicle at least along a collision-free trajectory, or generating at least one associated control command that causes the host motor vehicle to follow at least one of the collision-free trajectories.

8 Claims, 5 Drawing Sheets

(51) Int. Cl.
  *B60W 30/18*  (2012.01)
  *G08G 1/16*  (2006.01)
  *B60T 7/22*  (2006.01)
  *B62D 15/02*  (2006.01)
  *B60W 30/09*  (2012.01)

(52) U.S. Cl.
  CPC .. *B60W 30/0956* (2013.01); *B60W 30/18163* (2013.01); *B62D 15/0255* (2013.01); *B62D 15/0265* (2013.01); *G08G 1/165* (2013.01); *G08G 1/166* (2013.01); *G08G 1/167* (2013.01); *B60T 2201/022* (2013.01); *B60W 2520/10* (2013.01); *B60W 2550/14* (2013.01); *B60W 2550/30* (2013.01); *B60W 2710/207* (2013.01); *G05D 2201/0213* (2013.01)

(58) Field of Classification Search
  CPC ....... B60W 30/0956; B60W 30/18163; B60W 2520/10; B60W 2550/14; B60W 2550/30; B60W 2710/207; B62D 15/0255; B62D 15/0265; G08G 1/165; G08G 1/166; G08G 1/167
  See application file for complete search history.

(56) References Cited

U.S. PATENT DOCUMENTS

| | | | |
|---|---|---|---|
| 2010/0063735 A1* | 3/2010 | Kindo | B60W 40/072 701/300 |
| 2013/0235047 A1* | 9/2013 | Xia | G06T 13/40 345/474 |
| 2013/0325306 A1* | 12/2013 | Caveney | B60W 30/0953 701/117 |
| 2014/0316668 A1 | 10/2014 | Akiyama | |
| 2015/0120137 A1* | 4/2015 | Zeng | G05D 1/024 701/41 |
| 2016/0114798 A1* | 4/2016 | Kim | B60W 30/09 701/41 |
| 2016/0299229 A1* | 10/2016 | Heinonen | G01S 17/933 |
| 2017/0102707 A1* | 4/2017 | Reichel | B60W 30/095 |
| 2017/0254883 A1* | 9/2017 | Hamel | G01S 17/10 |

OTHER PUBLICATIONS

Keller et al. Article entitled "A Model Predictive Planning and Lateral Vehicle Control Approach for Collision Avoidance by Emergency Evading Maneuvers", Automotive meets Electronics, Feb. 24-25, 2015, pp. 8-13.

Keller et al. Article entitled "A Model Predictive Approach to Emergency Maneuvers in Critical Traffic Situations, 2015 IEEE18th International Conference on Intelligent Transportation Systems, Sep. 2015, pp. 369-374".

* cited by examiner

CONTROL SYSTEM AND CONTROL METHOD FOR GUIDING A MOTOR VEHICLE ALONG A PATH

RELATED APPLICATION

This application claims priority from German Application No 10 201 6009 760.4, filed Aug. 11, 2016, the subject matter of which is incorporated herein by reference in its entirety.

BACKGROUND OF THE INVENTION

A control system and a control method for guiding a motor vehicle along a path and for avoiding a collision with a preceding motor vehicle during a lane change are disclosed herein. This control system and control method are based in particular on a surroundings sensor system in the host motor vehicle, and assist a driver or an autonomously driving motor vehicle. The aim is to increase the safety of the occupants of the motor vehicle for semiautonomous motor vehicles and autonomously controlled motor vehicles.

Prior Art

Present driver assistance systems (advanced driver assistance systems (ADAS)) provide numerous monitoring and information functions in motor vehicles in order to make driving a motor vehicle safer. The surroundings of the motor vehicle are hereby monitored with regard to the travel course of the host motor vehicle, based on surroundings data obtained from one or more surroundings sensors situated on the motor vehicle.

Known driver assistance systems determine, for example, whether the motor vehicle is present within a lane, and whether the driver is unintentionally drifting to one side of the lane or is about to leave the lane. These driver assistance systems generate from the obtained surroundings data a "map" of the roadway and in particular of the lane. In the process, objects such as curbs, lane boundary lines, directional arrows, etc. are recognized and tracked during driving.

Present driver assistance systems also include so-called "blind spot monitors." These monitors determine, for example by means of radar, LIDAR, video, or the like, whether another motor vehicle, a road user, or an object is located to the side of and/or behind the motor vehicle, in which case a lane change or a turn by the host motor vehicle could result in a collision with same.

In addition, automatic speed control of the host motor vehicle is adapted to the speed of a preceding motor vehicle in so-called adaptive cruise control (ACC) systems. The intent is to always maintain a certain distance from the preceding motor vehicle. For this purpose, these types of systems determine a direction of movement and/or a speed of the preceding motor vehicle in order to avoid the host motor vehicle crossing the path of the preceding motor vehicle in such a way that a critical situation arises. This concerns lane change or turning operations on the one hand, and the avoidance of rear-end collisions on the other hand.

A speed controller in a motor vehicle which controls the distance from a preceding motor vehicle, and an emergency braking assistant in a motor vehicle, are driver assistance systems that react to other road users, for example other motor vehicles or pedestrians. For this purpose, the most relevant road user is selected in order to carry out an appropriate action.

This so-called route selection or destination selection frequently takes place by estimating the trajectory of the host motor vehicle and selecting the road user that is present on this trajectory. Estimating the trajectory is generally based on the knowledge of a speed and a yaw rate of the host motor vehicle, as well as other available information such as roadway markers.

One procedure in collision avoidance systems or automated driving includes computation of a path or trajectory for the host motor vehicle and subsequent attempts to guide the vehicle along the path/trajectory via a controller. However, during the planning, the dynamics of the closed control loop are usually not correctly taken into account, and designing vehicle controllers is complicated. Alternatively, a model predictive method is occasionally used which addresses both aspects in one step and takes the control dynamics into account with sufficient accuracy. However, this requires a very high level of computational effort, which in any case is not justifiable in series production vehicles for the foreseeable future.

Another approach is a model predictive trajectory set method. However, this method provides only a suboptimal solution for the optimal control problem due to its relatively coarse discretization of the control sequence. However, the planning and control are carried out in one step, and a dynamic, realistic model is explicitly taken into account.

In motor vehicles that are driven by persons, the driver assistance systems usually provide an information function in order to warn the driver of a critical situation or an appropriate maneuver, or to suggest to the driver a suitable maneuver for the host motor vehicle. Similarly, the driver assistance systems may also be used in autonomously controlled motor vehicles in order to provide the autonomous control system with the appropriate surroundings data.

The technological background in this regard is discussed in the publications "Ein modellprädiktives Planungs-und Fahrzeugquerregelungsverfahren zur Kollisionsvermeidung durch Notausweichmanöver" [A model predictive planning and vehicle lateral control method for avoiding collisions by emergency evasive maneuvers] by Keller, M., Haβ, C., Seewald, A., and Bertram, T. in Automotive meets Electronics, Feb. 24-25, 2015, Dortmund, February 2015, and "A Model Predictive Approach to Emergency Maneuvers in Critical Traffic Situations" by Keller, M., Haβ, C., Seewald, A., and Bertram, T. in IEEE Intelligent Transportation System Conference, Las Palmas de Gran Canaria, September 2015.

Underlying Problem

On roadways having multiple lanes in a travel direction, a lane change by a motor vehicle can have fatal consequences if, during the lane change by the host motor vehicle, the behavior of a preceding motor vehicle is incorrectly evaluated, incorrectly recognized, or recognized too late by a driver or a driver assistance system of the host motor vehicle. This applies, for example, for a slowing down of the preceding motor vehicle, on which the host motor vehicle, which is changing to the adjacent lane, could "get caught." This plays a role, for example, when the host motor vehicle changing to the adjacent lane is usually moving from a "slower" lane into a "faster" lane (i.e., in continental Europe or the United States, for example, from the right lane into the left lane). In Germany, for example, great differences in speed may exist between a preceding motor vehicle on the "slower" lane and a following motor vehicle on the "faster" lane, which the host motor vehicle changing to the adjacent lane must overcome so that, for example, following vehicles in the faster lane are not held up.

On account of such a speed difference to be achieved, for example a misjudgment or an initiation of the lane change of the host motor vehicle that is incorrect or too late may result in a collision with the preceding motor vehicle. Only strong braking or avoidance maneuvers can possibly prevent a rear-end collision. For motor vehicles that are following the host motor vehicle, this may result in braking operations and/or driving maneuvers by the following motor vehicle which are otherwise unnecessary. Such unnecessary braking operations and/or driving maneuvers may also endanger other road users and/or adversely affect driving comfort The object, therefore, is to provide a control system and a control method for a motor vehicle for guiding the motor vehicle along a path and for avoiding a collision with a preceding motor vehicle during a lane change.

Proposed Solution

This object is achieved by a control system and a control method having the features of the respective independent claims.

A control system that is configured and intended for use in a host motor vehicle recognizes preceding motor vehicles and preferably stationary objects situated ahead, based on surroundings data obtained from at least one surroundings sensor associated with the host motor vehicle. The at least one surroundings sensor is configured for providing an electronic controller of the control system with surroundings data that represent an area in front of the host motor vehicle. The control system is at least configured and intended for determining, starting from an instantaneous location, a set having a predefined number of trajectories, differing with regard to their length and/or their course, for possible paths of the host motor vehicle, wherein the course of neighboring trajectories differs by a predefined difference between possible different steering angles of the host motor vehicle, and for varying the predefined number of trajectories, the length, and/or the course of the trajectories as a function of a driving situation of the host motor vehicle. The control system is at least configured and intended for generating at least one signal that assists a driver of the host motor vehicle in controlling the host motor vehicle in order to guide the host motor vehicle along a selected one of these trajectories, or for generating at least one associated control command that causes the host motor vehicle to follow a selected one of these trajectories.

One aspect relates to the control system that is configured and intended for use in a host motor vehicle. The control system that is configured and intended for this purpose may vary the predefined number of trajectories, the length, and/or the course of the trajectories as a function of the following aspects of the driving situation of the host motor vehicle: (i) the speed of the host motor vehicle, (ii) a lateral, rear, and/or frontal distance from another motor vehicle using the road, relative to the host motor vehicle, (iii) a relative speed between another motor vehicle using the road and the host motor vehicle, and/or (iv) a roadway course in front of the host motor vehicle.

In determining the trajectories for possible paths of the host motor vehicle, in a first discretization step (i) the number of trajectories may be specified to be a first number of approximately 3 to 15, and/or (ii) the difference between possible different steering angles of the host motor vehicle may be specified to remain the same or to increase with an increasing different steering angle, by the control system that is configured and intended for this purpose.

In determining the trajectories for possible paths of the host motor vehicle, in a following discretization step the control system may also be configured and intended for (i) specifying the number of trajectories to be a second, lower number of approximately 3 to 5, and/or (ii) reducing the difference between possible different steering angles of the host motor vehicle.

Compared to conventional driver assistance systems, the approach presented here improves a low-risk execution of a lane change of the host motor vehicle relative to a preceding motor vehicle. The host motor vehicle hereby preferably changes from a "slower" lane to a "faster" lane. This low-risk execution of a lane change is achieved in particular in that the control system is able to determine "incorrect" or "unfavorable" trajectories, and is configured for keeping the driver from using these "incorrect" or "unfavorable" trajectories.

In addition, the system may merely suggest that the driver change from trajectories that are instantaneously evaluated as critical to a less critical, or even favorable, or even an instantaneously optimal trajectory. Thus, use of the system is not limited to "emergency situations," and instead may be used in many situations. One (semi)autonomous intervention option by the system is a steering torque overlay.

Alternatively or additionally, the driver may be optically, haptically, or acoustically advised by the system to leave such a critical trajectory.

A system that is able to determine the "best" trajectory in all conceivable situations, in particular emergency situations, for example, requires a significant outlay of sensor and computing resources. For example, extremely complex situations must be processed on multilane freeways. In a considerable number of scenarios, determining the "best" trajectory for the host motor vehicle is not possible at all due to the lack of information concerning all possible obstruction trajectories.

Therefore, the system presented here takes a different approach. This does not involve bringing the host motor vehicle to the trajectory that is instantaneously evaluated as the "correct" one. Instead, the host motor vehicle is diverted from trajectories that are instantaneously evaluated as "incorrect."

The system presented here identifies "incorrect" or "unfavorable" trajectories and (i) signals this to the driver or (ii) (semi)autonomously intervenes in the driving behavior, for example by a braking or steering torque overlay in the host motor vehicle.

Thus, use of the system is not limited to emergency situations, and instead may be used in many situations. It is also conceivable to use manipulated variables other than the steering torque overlay.

For this purpose, a control system that is configured and intended for use in a host motor vehicle is used to recognize, based on surroundings data obtained from at least one surroundings sensor associated with the host motor vehicle, preceding motor vehicles and preferably stationary objects situated ahead, wherein the at least one surroundings sensor is configured for providing an electronic controller of the control system with surroundings data that represent an area in front of, next to, and/or behind the host motor vehicle, and wherein the control system is at least configured and intended for detecting another motor vehicle, using the road, in front of the host motor vehicle by means of the at least one surroundings sensor, and determining movements of the other motor vehicle relative to (i) a lane in which the other motor vehicle or the host motor vehicle is present, or (ii) the host motor vehicle. Starting from an instantaneous location, the control system determines a set having a predefined number of trajectories, differing with regard to their length and/or their course, for possible paths of the host motor vehicle, wherein the course of neighboring trajectories differs by a predefined difference between possible different steering angles of the host motor vehicle.

The control system is configured and intended for correlating the course of the determined trajectories for possible paths of the host motor vehicle with the provided surroundings data, classifying the determined trajectories as (i) trajectories involving a collision, (ii) collision-free trajectories, and/or (iii) optimal trajectories, determining an instantaneously traveled trajectory of the host motor vehicle and comparing it to the classified trajectories, and based on this situation recognition for the host motor vehicle, making an intervention decision, and generating at least one signal that assists a driver of the host motor vehicle in controlling the host motor vehicle in order to guide the host motor vehicle at least along a collision-free trajectory, or generating at least one associated control command that causes the host motor vehicle to follow at least one of the collision-free trajectories.

The control system is configured and intended for the signal to initiate an intermittent braking or steering torque overlay in the host motor vehicle, wherein successive individual overlays are spaced at time intervals such that the driver perceives them as a separate intervention in terms of a steering suggestion or directional information.

In one variant, the signal is designed as a pulse that rises more quickly than it falls. A sawtooth pulse is one possible signal form by means of which the driver clearly perceives the pulse as a braking or steering torque overlay in the host motor vehicle. However, other pulse forms are also possible.

These system variants allow collision avoidance in emergency situations and recognize unequivocal driver errors; for example, if the driver steers the host motor vehicle into an obstacle or destabilizes the host motor vehicle, a signal is emitted to warn the driver, or a braking or steering torque overlay in the host motor vehicle immediately takes place. For example, in right-hand traffic on a curved highway, if the driver cuts a corner on a tight curve to the left and is at risk of colliding with an oncoming vehicle, a signal is emitted to warn the driver, or a braking or steering torque overlay in the host motor vehicle immediately takes place. For example, if the driver cuts a curve and is at risk of contacting the curb, a signal is emitted to warn the driver, or a braking or steering torque overlay in the host motor vehicle immediately takes place. For example, if the driver starts to pass on a freeway and fails to observe traffic in the adjacent lane, a signal is emitted to warn the driver, or a braking or steering torque overlay in the host motor vehicle immediately takes place.

This allows an increase in driving safety and driving comfort, in that during a lane change by the host motor vehicle, possible problems due to a preceding other motor vehicle are recognized correctly and in a timely manner, and a speed adaptation and/or a driving maneuver of the host motor vehicle may thus be carried out either by the driver or by a driver assistance system in order to avoid an accident.

A discretization of adaptive manipulated variables may be carried out by the system in determining the trajectories, which represents an important aspect for implementation in the motor vehicle. For a fixed discretization, the trajectories can have only fixed, discrete radii of curvature or trajectory lengths along which the host motor vehicle is driven. If, for example, the host motor vehicle is traveling on a freeway exit having a radius of curvature of the roadway that happens to not be a part of the discrete quantity of possible radii of curvature of the trajectories, a switch must continuously be made back and forth between two (unsuitable) radii of curvature of the trajectories in order to at least approximate the radius of curvature of the roadway. This results in oscillations in the host motor vehicle, and thus, unsuitable driving behavior.

In the adaptive discretization presented here, the instantaneously possible or employed control range of the trajectory of the host motor vehicle is specified in a first discretization step. More fine-tuned discretization is then carried out in a second discretization step. This two-step concept allows virtually quasi-continuous readjustment. Thus, practically any given radius of curvature of the trajectory to be traveled may be achieved with comparatively little computational effort, and thus, very quickly.

By means of the control system, in contrast to conventional driver assistance systems, a misjudgment of an unsteady driving behavior of the other motor vehicle during the lane change of the host motor vehicle may be avoided or at least reduced. If the control system determines, for example, a lateral movement of the other motor vehicle relative to the associated lane in which the other motor vehicle is present, this may be regarded as "critical" in the determination of possible trajectories. If the driver of the host motor vehicle should pursue one of these trajectories, this is signaled as unfavorable; in a further scenario the controller intervenes in the steering/driving process.

In one variant, the control system is also configured and intended for emitting a signal that is suitable for warning a driver of the host motor vehicle of critical trajectories. The control system may thus assist the driver of the host motor vehicle in taking suitable measures. Additionally or alternatively, the signal may be suitable for carrying out an autonomous trajectory adaptation and/or speed adaptation of the host motor vehicle, and/or for taking this into account for an autonomous lane change or autonomous driving maneuver by the host motor vehicle.

The control system may ascertain the host lane and the other lane, for example based on surrounding features such as lane boundaries and/or lane markers. The control system may likewise ascertain these surrounding features based on surroundings data obtained by means of the at least one surroundings sensor. In addition, the control system may also be provided with the surrounding features by an external system, for example a GPS system.

Furthermore, the control system may be configured and intended for detecting, over a predetermined time period or continuously, the other motor vehicle using the road, by means of the at least one surroundings sensor, in order to determine the lateral movement of the other motor vehicle. It is thus possible for the control system to more reliably determine whether an instantaneous lateral movement of the other motor vehicle signifies a lane change, or whether this instantaneous lateral movement of the other motor vehicle is due to the individual driving behavior of the driver of the other motor vehicle.

The lateral movement of the other motor vehicle may be determined based on position values and/or lateral speed values.

The control system may also be configured and intended for determining the lateral movement of the other motor vehicle, and determining, during the predetermined time period or continuously, a change in a distance between a longitudinal axis of the other motor vehicle and a centerline, at least one lane boundary, or at least one lane marker of the associated lane in which the other motor vehicle is present. The centerline and the lane boundary of the associated lane may be a virtual, instantaneous centerline or instantaneous lane boundary of the associated lane that is determined by the control system. Similarly, the control system may determine, during the predetermined time period or continuously, a change in the distance between a longitudinal axis of the other motor vehicle and a virtual or real lane marker or lane boundary on which the host motor vehicle is present.

In one refinement, the control system may be configured and intended for determining the instantaneous traffic situation of other motor vehicles using the road, and/or detecting objects in front of the host motor vehicle, by means of the at least one surroundings sensor. These other motor vehicles and/or objects may be present in an area directly in front of the host motor vehicle as well as in an area at a farther distance away, depending on the surroundings sensor used. It is understood that multiple surroundings sensors may also be used in the control system in order to detect the other motor vehicle, additional motor vehicles, objects, and/or other surrounding features on which the surroundings data are based.

The control system may also establish that no additional motor vehicles and/or objects are present in front of, next to, and/or behind the host motor vehicle.

The control system may be configured and intended for determining the instantaneous traffic situation at a distance between the other motor vehicle and an additional motor vehicle or object located in front of the other motor vehicle, as well as a speed difference between the other motor vehicle and the additional motor vehicle or object located in front of the other motor vehicle, wherein the other motor vehicle and the additional motor vehicle or object located in front of the other motor vehicle are present in the same lane or an adjacent lane.

For example, if the determined distance is small, while the determined speed difference is large, in the adaptive discretization presented here the instantaneously possible or employed control range of the trajectory of the host motor vehicle is specified in a first discretization step. More fine-tuned discretization is then carried out in a second discretization step. This allows virtually quasi-continuous readjustment. Thus, a sufficient selection of low-risk trajectories for the instantaneous driving situation of the host motor vehicle may be determined in a practical manner with comparatively little computational effort, and thus, very quickly.

The control system may be configured and intended for determining the instantaneous traffic situation at a distance between the other motor vehicle and a motor vehicle or object that is offset in front of the other motor vehicle, and for determining a speed difference between the other motor vehicle and the motor vehicle or object that is offset in front of the other motor vehicle, wherein the other motor vehicle and the motor vehicle or object that is offset in front of the other motor vehicle are present in different lanes. For example, the offset motor vehicle or object may be present in the same lane as the host motor vehicle.

It is apparent to those skilled in the art that the aspects and features described above may be arbitrarily combined in a control system and/or a control method. Although some of the above-described features have been explained with reference to a control system, it is understood that these features may also apply to a control method. Likewise, the features described above with reference to a control method may correspondingly apply to a control system.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

DETAILED DESCRIPTION OF THE DRAWINGS

Figure 1:
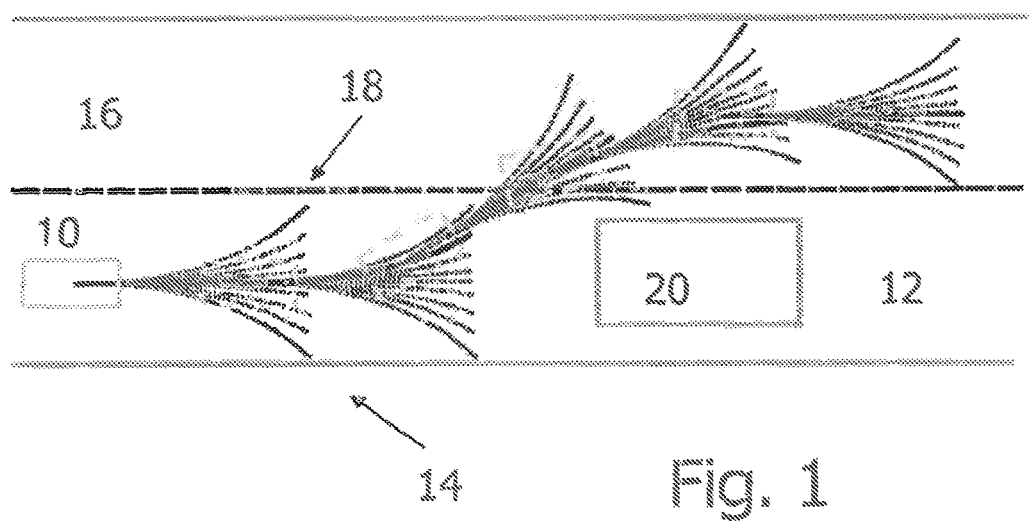
FIG. 1 schematically shows a host motor vehicle, in which a sequence of trajectory sets, detected by means of a first control system in an area in front of the host motor vehicle, is computed, on the basis of which a trajectory for a segment in each case establishes the travel path of the host motor vehicle.

FIG. 1 schematically shows a host motor vehicle 10 that is present in the right lane 12 of a roadway 14. An additional, left lane 16 of the roadway 14 is situated next to the right lane 12. The right lane 12 and the left lane 16 of the roadway 14 are separated from one another by a dashed-line roadway marker 18.

The host motor vehicle 10 has at least one surroundings sensor (not shown) that is associated with the host motor vehicle 10 and mounted thereon. The surroundings sensor may be designed, for example, in the form of a camera, although use of other known surroundings sensors (radar, LIDAR, ultrasound, etc.) is also possible. The at least one surroundings sensor is configured for detecting an area in front of the host motor vehicle 10, and providing the surroundings data that represent this area to an electronic controller (not shown) of a control system (not shown) installed in the host motor vehicle 10. In the example shown in FIG. 1, a first control system detects the other motor vehicle 20 by means of the at least one surroundings sensor. The host motor vehicle 10 is traveling toward the other motor vehicle 20 at a speed that is greater than the speed of the other motor vehicle 20. For this reason, the host motor vehicle 10 in the situation shown in FIG. 1 makes a lane change from the right lane, along a sequence of trajectories 30, to the left lane.

It is explained below how the traveled sequence of trajectories 30 comes about due to the control system.

The control system detects one or more other motor vehicles 20, using the road, in front of the host motor vehicle 10 by means of the at least one surroundings sensor, and determines movements of the other motor vehicle 20 relative to a lane 12, 16 in which the other motor vehicle 20 or the host motor vehicle 10 is present, or (ii) relative to the host motor vehicle 10. Starting from an instantaneous location of the host motor vehicle 10, the control system determines a set having a predefined number of trajectories, differing with regard to their length and/or their course, for possible paths of the host motor vehicle 10. The course of neighboring trajectories differs by a predefined difference between possible different steering angles of the host motor vehicle 10. In one variant of the control system, this procedure is carried out approximately every 20 ms; during this time period approximately 15 possible trajectories are computed.

Starting from the set of trajectories determined in each case in this manner, their predefined number, their length, and/or their course are/is varied as a function of a driving situation of the host motor vehicle 10.

This variation takes place in the control system as a function of the following aspects of the driving situation of the host motor vehicle 10: (i) the speed of the host motor vehicle (10)—the higher the speed of the host motor vehicle, the longer the individual computed trajectory of the set; (ii) a lateral, rear, and/or frontal distance from another motor vehicle 20 using the road, relative to the host motor vehicle 10—the smaller the distance, the smaller the angular distance between neighboring trajectories of the set; (iii) a relative speed between the other motor vehicle 20 and the host motor vehicle 10—the higher the relative speed, the longer the individual computed trajectory of the set, and the smaller the angular distance between neighboring trajectories of the set; and/or (iv) a roadway course in front of the host motor vehicle 10—the smaller the radius of curvature, the shorter the individual computed trajectory of the set, and the smaller the angular distance between neighboring trajectories of the set.

Figure 2:
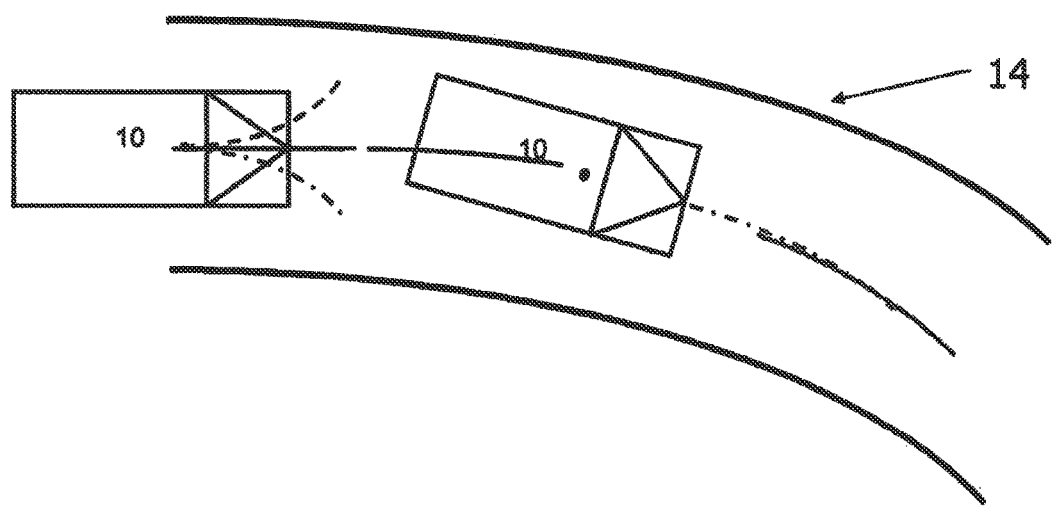
FIG. 2 schematically shows the host motor vehicle, in which a second control system generates a sequence of trajectories and associated signals or control commands for passing a preceding motor vehicle, and when the trajectories for possible travel paths of the host motor vehicle are determined, a two-step adaptive discretization takes place.

In one variant, the control system carries out a two-step procedure in determining the trajectories for possible paths of the host motor vehicle 10 (see FIG. 2). In a first discretization step, (i) the number of trajectories is specified to be approximately 3 to 15 and (ii) the difference between possible different steering angles of the host motor vehicle 10 is specified to remain the same or to increase with an increasing different steering angle. It is assumed that it is more unlikely that larger steering angles (>+/−20°, for example) are adopted than smaller steering angles (<+/−20°, for example).

In a subsequent discretization step, for determining the trajectories for possible paths of the host motor vehicle 10, the control system (i) reduces the number of trajectories to approximately 3 to 5, and (ii) reduces the difference between possible different steering angles of the host motor vehicle 10 to approximately 2°.

Based on these trajectory data, the control system generates at least one signal that assists a driver of the host motor vehicle in controlling the host motor vehicle in order to guide the host motor vehicle 10 along a selected one of these trajectories, or generates at least one associated control command that causes the host motor vehicle 10 to follow a selected one of these trajectories. In other words: The curve is approximately implemented in the first step (A in FIG. 2). Discretization in small increments is then performed around this approximate solution in the next step. The discretization "converges" at the required steering angle. It is thus possible to achieve any drivable curvature in a steady-state manner without switching back and forth between only approximately matching radii of curvature (B in FIG. 2).

Figure 3:
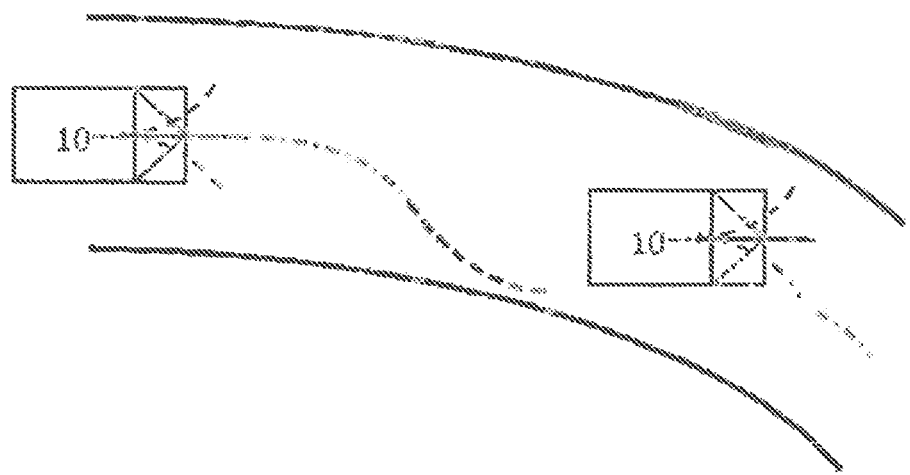
FIG. 3 schematically shows the host motor vehicle, in which the control system determines only a few different linear different trajectories.

The advantageous effect of this procedure is clear with respect to the situation in FIG. 2 compared to FIG. 3. If the control system of the host motor vehicle 10 determines only a few different trajectories, as shown in FIG. 3, in order to be prepared for all contingencies these trajectories must provide a relatively large difference (in the present case, approximately 35°) between adjacent possible steering angles of the host motor vehicle 10. When negotiating a curve, it is highly unlikely that one of the predefined steering angles exactly matches the curvature of the curve. Therefore, the control system of the host motor vehicle 10 must make readjustments in increments, using another of the predefined steering angles. As a result, the host motor vehicle 10 would negotiate the curve in a lurching manner (see FIG. 3).

In other words: Of the three possible trajectories, none exactly implements the roadway course. A switch must always be made back and forth between two solutions.

Figure 4:
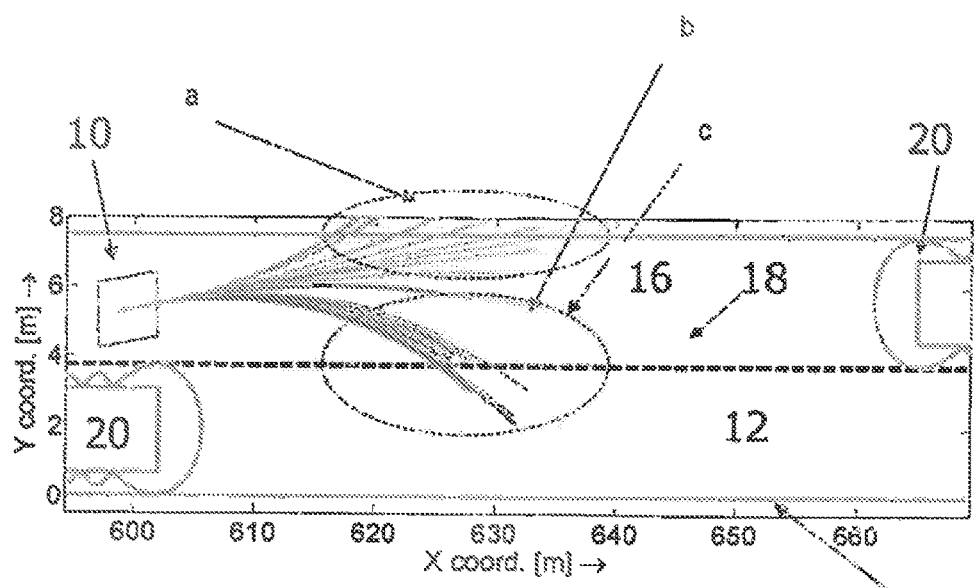
FIG. 4 schematically shows the host motor vehicle, in which the control system, starting from an instantaneous location of the host motor vehicle, determines a set having a predefined number of different trajectories, with regard to their length and/or their course, for possible paths of the host motor vehicle.

As illustrated in FIG. 4, the control system of the host motor vehicle 10, starting from an instantaneous location of the host motor vehicle 10, determines a set having a predefined number of trajectories, differing with regard to their length and/or their course, for possible paths of the host motor vehicle 10. The course of neighboring trajectories differs by a predefined difference between possible different steering angles of the host motor vehicle. In the example in FIG. 4, this is approximately 4° in each case. In addition, the control system of the host motor vehicle 10 correlates the course of the determined trajectories for possible paths of the host motor vehicle 10 with the provided surroundings data. If one of the trajectories collides with objects (other vehicles, roadway boundaries, or the like), it is classified as a trajectory involving a collision. If a trajectory does not encounter an object over its length, it is classified as a collision-free trajectory. As a result of this procedure, all determined trajectories are classified as (i) trajectories involving a collision, (ii) collision-free trajectories, and/or (iii) optimal trajectories, as illustrated in FIG. 4.

In this regard, the indicated reference characters denote the following: a: If the host motor vehicle is guided on one of these trajectories, It will collide; b: Optimal trajectory; c: Collision-free trajectories.

It is not mandatory for a trajectory to also be classified as an optimal trajectory. Rather, it is sufficient to make a distinction between trajectories involving a collision and collision-free trajectories.

The control system of the host motor vehicle 10 subsequently determines a/the instantaneously traveled trajectory of the host motor vehicle 10 and compares it to the classified trajectories. Starting from this situation recognition for the host motor vehicle 10, the control system of the host motor vehicle 10 makes an intervention decision to generate at least one signal that assists a driver of the host motor vehicle 10 in controlling the host motor vehicle 10 in order to guide it at least along one of the collision-free trajectories. In a (semi)autonomous driving mode, at least one associated control command is generated that causes the host motor vehicle 10 to follow at least one of the collision-free trajectories.

In one variant of the control system, the signal is designed as an intermittent braking or steering torque overlay in the host motor vehicle, which is set by suitable actuators (not illustrated) for a steering gear or a vehicle braking system. In one embodiment of the control system, successive individual overlays are spaced at time intervals such that the driver perceives them at the steering wheel as a separate intervention in terms of a steering suggestion or directional information.

Figure 5:
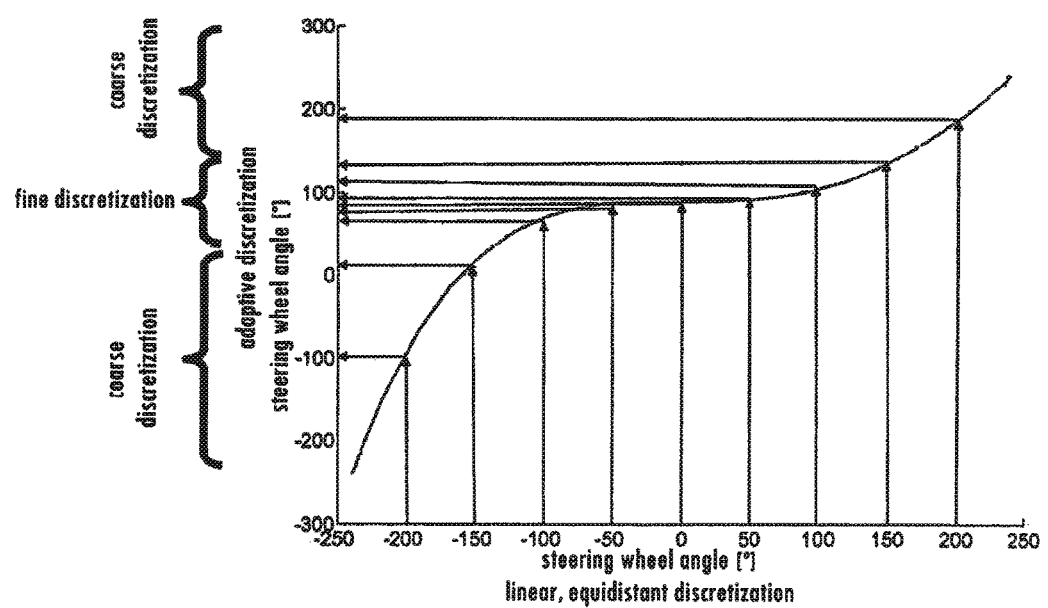
FIG. 5 shows a diagram of the different effect of a linear, equidistant discretization and the two-step or multi-step adaptive discretization for computing the trajectory set for possible travel paths of the host motor vehicle.

FIG. 5 illustrates the difference between a linear, equidistant discretization of the steering wheel angle and an adaptive discretization of the steering wheel angle. In this example, ten discrete steering angles are illustrated from −200° to +200° at intervals of 50°. If a steering angle of 90° were required in a steering situation, for a linear, equidistant discretization of the steering wheel angle the closest steering wheel angle of 100° would be set, but the trajectories of the other ten discrete steering wheel angles between −200° and +200° would also be computed. In the adaptive discretization of the steering wheel angle presented here, the ten discrete steering wheel angles between −100° to +100° are computed in the next step, whereby more trajectories are computed in the vicinity of the instantaneous steering wheel angle of 90° than farther away from this angle. One trajectory is computed at −100°, one is computed near 0°, and one is computed near 200°; six different trajectories situated very close to one another are computed near the instantaneous steering wheel angle of 90°. This procedure allows a very efficient determination of collision-free trajectories, which the control system can facilitate by emitting appropriate signals for the steering torque overlay, for example.

It is understood that the exemplary embodiments explained above are not exhaustive, and do not limit the subject matter disclosed herein. In particular, it is apparent to those skilled in the art that they may combine the features of the various embodiments with one another and/or omit various features of the embodiments without thereby departing from the subject matter disclosed herein.

The invention claimed is:

1. A control system for use in a host motor vehicle (10) configured to recognize motor vehicles traveling ahead, to the side, and/or behind and preferably stationary objects situated ahead, based on surroundings data obtained from at least one surroundings sensor associated with the host motor vehicle (10), the control system comprising:
an electronic controller receiving surroundings data from the at least one surroundings sensor that represent an area in front of the host motor vehicle (10),
the control system further being configured to:
determine, starting from an instantaneous location, a set having a predefined number of trajectories, differing with regard to their length and/or their course, for possible paths of the host motor vehicle (10), wherein the course of neighboring trajectories differs by a predefined difference between possible different steering angles of the host motor vehicle (10), and
vary the determined trajectories as a function of a driving situation of the host motor vehicle (10) by reducing the difference between possible different steering angles of the host motor vehicle (10), and
generate at least one signal that assists a driver of the host motor vehicle in controlling the host motor vehicle in order to guide the host motor vehicle (10) along a selected one of these trajectories, or generate at least one associated control command that causes the host motor vehicle (10) to follow a selected one of these trajectories.

2. The system according to claim 1, wherein the control system is further configured to vary the determined trajectories as a function of the following aspects of the driving situation of the host motor vehicle (10):
(i) the speed of the host motor vehicle (10),
(ii) a lateral, rear, and/or frontal distance from another motor vehicle (20) using the road, relative to the host motor vehicle (10),
(iii) a relative speed between another motor vehicle (20) using the road and the host motor vehicle (10), and/or
(iv) a roadway course in front of the host motor vehicle (10).

3. The system according to claim 1, wherein the control system, for determining the trajectories for possible paths of the host motor vehicle (10), is further configured to specify in a first discretization step (i) the number of trajectories to be approximately 3 to 15, and/or (ii) the difference between possible different steering angles of the host motor vehicle (10) to remain the same or to increase with an increasing different steering angle.

4. The system according to claim 1, wherein the control system, for determining the trajectories for possible paths of the host motor vehicle (10), is further configured in a following discretization step to (i) specify the number of trajectories to be approximately 3 to 5, and/or (ii) reduce the difference between possible different steering angles of the host motor vehicle (10).

5. A control method for use in a host motor vehicle (10) that is configured for recognizing motor vehicles traveling ahead, to the side, and/or behind and preferably stationary objects situated ahead, based on surroundings data obtained from at least one surroundings sensor associated with the host motor vehicle (10), wherein the at least one surroundings sensor is configured for providing an electronic controller of the control system with surroundings data that represent an area in front of the host motor vehicle (10), the control method comprising the steps of:
determining, starting from an instantaneous location, a set having a predefined number of trajectories, differing with regard to their length and/or their course, for possible paths of the host motor vehicle (10), wherein the course of neighboring trajectories differs by a predefined difference between possible different steering angles of the host motor vehicle (10), and
varying the determined trajectories as a function of a driving situation of the host motor vehicle (10) by reducing the difference between possible different steering angles of the host motor vehicle (10), and
generating at least one signal that assists a driver of the host motor vehicle in controlling the host motor vehicle in order to guide the host motor vehicle (10) along a selected one of these trajectories, or for generating at least one associated control command that causes the host motor vehicle (10) to follow a selected one of these trajectories.

6. The control method according to claim 5, wherein varying the determined trajectories is a function of the following aspects of the driving situation of the host motor vehicle (10):
(i) the speed of the host motor vehicle (10),
(ii) a lateral, rear, and/or frontal distance from another motor vehicle (20) using the road, relative to the host motor vehicle (10),
(iii) a relative speed between another motor vehicle (20) using the road and the host motor vehicle (10), and/or
(iv) a roadway course in front of the host motor vehicle (10).

7. The control method according to claim 5, wherein determining the trajectories for possible paths of the host motor vehicle (10 specifies in a first discretization step (i) the number of trajectories to be approximately 3 to 15, and/or (ii) the difference between possible different steering angles of the host motor vehicle (10) to remain the same or to increase with an increasing different steering angle.

8. The control method according to claim 5, wherein determining the trajectories for possible paths of the host motor vehicle (10 in a following discretization step (i) specifies the number of trajectories to be approximately 3 to 5, and/or (ii) reduces the difference between possible different steering angles of the host motor vehicle (10).

* * * * *